United States Patent
Xu (10) Patent No.: US 10,243,683 B2
(45) Date of Patent: Mar. 26, 2019

(54) INTERFERENCE CANCELLATION TECHNIQUE

(71) Applicant: Telefonaktiebolaget LM Ericsson (publ), Stockholm (SE)

(72) Inventor: Bai Cheng Xu, Nuremberg (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/303,865

(22) PCT Filed: Apr. 17, 2014

(86) PCT No.: PCT/EP2014/057888
§ 371 (c)(1),
(2) Date: Oct. 13, 2016

(87) PCT Pub. No.: WO2015/158388
PCT Pub. Date: Oct. 22, 2015

(65) Prior Publication Data
US 2017/0041096 A1 Feb. 9, 2017

(51) Int. Cl.
*H04W 4/00* (2018.01)
*H04J 11/00* (2006.01)
*H04W 48/16* (2009.01)

(52) U.S. Cl.
CPC ......... *H04J 11/005* (2013.01); *H04J 11/0073* (2013.01); *H04J 11/0076* (2013.01);
(Continued)

(58) Field of Classification Search
None
See application file for complete search history.

(56) References Cited

U.S. PATENT DOCUMENTS

| 2008/0181194 A1 | 7/2008 | Lindoff | |
|---|---|---|---|
| 2012/0046056 A1 | 2/2012 | Luo et al. | |
| 2012/0231790 A1* | 9/2012 | Lindoff | H04W 48/16 455/434 |

FOREIGN PATENT DOCUMENTS

| CN | 101340208 A | 1/2009 |
|---|---|---|
| EP | 2690809 A1 | 1/2014 |

OTHER PUBLICATIONS

3rd Generation Partnership Project, "3rd Generation Partnership Project; Technical Specification Group Radio Access Network; Evolved Universal Terrestrial Radio Access (E-UTRA); Physical Channels and Modulation (Release 11)", Technical Specification, 3GPP TS 36.211 V11.3.0, Jun. 1, 2013, pp. 1-108. 3GPP, France.

* cited by examiner

*Primary Examiner* — Zewdu A Beyen
(74) *Attorney, Agent, or Firm* — Patent Portfolio Builders, PLLC (57) ABSTRACT

A technique for cancelling interference in a cellular network (100) is provided. The cellular network (100) comprises intra-frequency cells (102, 104, 106) sending a first identifying signal indicative of a first identifier (ID1) and a second identifying signal indicative of a second identifier (ID2). Each of the cells is identified by a combination of the first identifier and the second identifier. As to a method aspect of the technique, first samples of the first identifying signal are extracted from a signal received by a User Equipment (120). The first samples include contributions from different cells (104, 106) of the cellular network (100). A first set of sample points is selected based on the first samples and a first candidate (104-1) for the first identifier (ID1). Second samples of the second identifying signal are extracted from the received signal. The second sample includes contributions from the different cells (104, 106). A second set of (Continued)

sample points is selected based on the second samples and a second candidate (104-2) for the second identifier (ID2). The interference of the first identifying signal and/or the second identifying signal is cancelled from the received signal based on both the first set and the second set.

17 Claims, 7 Drawing Sheets

(52) U.S. Cl.
CPC .. *H04J 2011/0096* (2013.01); *H04J 2211/001* (2013.01); *H04W 48/16* (2013.01)

INTERFERENCE CANCELLATION TECHNIQUE

TECHNICAL FIELD

The present disclosure generally relates to a technique for cancelling interference caused by different cells of a cellular network. More specifically, and without limitation, the disclosure relates to a method and a device for cancelling interference in a cellular network comprising intra-frequency cells that send identifying signals that are partly identical.

BACKGROUND

The radio frequency spectrum is a rare resource for mobile communication. Spatial diversity allows increasing data rates of a cellular network by increasing the density of intra-frequency cells. The transmission power of the cells may also be adapted to indoor and outdoor environments, e.g., in heterogeneous networks (also abbreviated by HetNet), which have been introduced in Release 9 of Long Term Evolution (LTE). Out of the plurality of at least pairwise overlapping cells, a mobile terminal or mobile station, which is generally referred to as User Equipment (UE), has to detect a suitable cell for cell selection and reselection in an idle mode and for preparing handovers in a connected mode.

Cell synchronization is a very first step when the UE wants to camp on a cell of the cellular network. The UE acquires a Physical Cell Identity (PCI) of the cell and a radio frame timing, which information enables the UE to read the Master Information Block (MIB) and one or more System Information Blocks (SIB).

The UE reads a Primary Synchronization Signal (PSS) indicative of a physical layer identity and a Secondary Synchronization Signal (SSS) indicative of a physical layer cell identity group number. The PCI is the combination of the physical layer identity and the physical layer cell identity group number.

The physical layer identity has only three different hypotheses, so that the UE may receive time-shifted copies of the PSS indicative of the same physical layer identity from different cells. Even if the UE would consider only the two strongest cells, the three different values possible for the physical layer identity are not sufficient to distinguish neighboring cells as a consequence of the Four Color Theorem. Collisions between different intra-frequency cells having the same physical layer identity can also occur in heterogeneous networks including a picocell embedded within a macrocell, or in dense cellular topologies including areas covered by three or more different cells.

As a consequence, when the UE perform interference cancellation by canceling the PSS of the interfering cell in order to detect one or more other cells, the PSS of all cells having the same physical layer identity is removed from the received signal, so that the UE cannot detect any further cells having the same physical layer identity as the strongest cell.

SUMMARY

Accordingly, there is a need for an interference cancellation technique that allows cancelling signals of an interfering cell without cancelling signals of another cell having some identifying signals in common with the interfering cell.

According to one aspect, a method of cancelling interference in a cellular network is provided. The cellular network comprises intra-frequency cells sending a first identifying signal indicative of a first identifier and a second identifying signal indicative of a second identifier. Each cell is identified by a combination of the first identifier and the second identifier. The method comprises a step of extracting first samples of the first identifying signal from a signal received by a User Equipment (UE), the first samples including contributions from different cells of the cellular network; a step of selecting a first set of sample points based on the first samples and a first candidate for a first identifier; a step of extracting second samples of the second identifying signal from the received signal, the second samples including contributions from the different cells; a step of selecting a second set of sample points based on the second samples and a second candidate for the second identifier; and a step of cancelling the interference of at least one of the first identifying signal indicative of the first candidate and the second identifying signal indicative of the second candidate from the received signal based on both the first set and the second set.

The term UE, as used herein, may encompass any mobile terminal or mobile station wirelessly connectable with the cellular network.

The method may be performed, completely or in part, by the UE receiving the signal. The expressions "first identifying signal" and "second identifying signal", as used herein, may be defined in terms of certain signaling periods, e.g., relative to a radio frame, as received at the UE. Therefore, the singular form of first/second "identifying signal" does not necessarily imply that the identify signal originates from one cell.

At least some embodiments of the technique can detect signals of a first cell subjected to interference caused by a second cell, even if one of the first identifying signal and the second identifying signal of the first cell and the second cell are identical.

In same or other embodiments, the first set can be interpreted as representing a first set of paths along which the first identifying signal indicative of the first candidate is received at the UE. The second set can be interpreted as representing a second set of paths along which the second identifying signal indicative of the second candidate is received at the UE. The first set considered in isolation may include paths originating from two or more different cells that have the first identifier in common. The second set considered in isolation may include paths originating from two or more different cells that have the second identifier in common. The two or more different cells may be distinguishable by the UE based on the combination of the first identifier and the second identifier.

In same or further embodiments, one or more cells may be indistinguishable based on one of the first identifier and the second identifier. Basing the interference cancellation on both the first set and the second set allows cancelling at least one of the first identifying signal and the second identifying signal sent exclusively by the cell identified by the combination of the first candidate and the second candidate. Same or still further embodiments of the technique avoid that the interference cancellation eliminates signal contributions from cells other than the cell identified by the combination of the first candidate and the second candidate.

The sample points may be points on a time axis. Alternatively or in addition, each of the sample points may be defined by an index number, e.g., based on a sequence of the first samples and/or a sequence of the second samples. The first set of sample points may be a subset of sample points of the first samples. The second set may be a subset of sample points of the second samples. The first set may indicate one or more sample points out of the first samples. The second set may indicate one or more sample points out of the second samples.

The first samples and/or the second samples may be extracted in the time domain from the received signal. The first set and/or the second set may be selected in the time domain. Each of the first samples and/or each sample indicated by the first set may correspond to a point in time relative to a first time window (e.g., a symbol duration) used by one or all of the intra-frequency cells for sending the first identifying signal. Each of the second samples and/or each sample indicated by the second set may correspond to a point in time relative to a second time window (e.g., a symbol duration) used by one or all of the intra-frequency cells for sending the second identifying signal. A time offset of the point in time relative to the beginning of the time window may correspond to a propagation time of the corresponding path along which the first and second identifying signals are received at the UE.

The selection of the first set of sample points may be restricted to first samples falling within a first selection time window. The selection of the second set of sample points may be restricted to second samples falling within a second selection time window. A beginning of the first selection time window may coincide with a beginning of the first time window. A beginning of the second selection time window may coincide with a beginning of the second time window.

A length of the first selection time window and/or the second selection time window may be in the range of 1 microseconds to 10 microseconds, e.g., about 5 microseconds or about 6 microseconds. The first selection time window may correspond to the first 10% of the sample points of the first samples. The second selection time window may correspond to the first 10% of the sample points of the second samples. The first selection time window and the second selection time window may be equal in length, e.g., in terms of time and/or number of sample points. The selection time window may be independent of a temporal position at which the first samples and the second samples are extracted from the received signal. The selection time window applied for selecting the first set and the second set may be defined relative to the beginning of the first samples and relative to the beginning of the second samples, respectively.

The interference cancellation of the first and/or second identifying signal may include regenerating the corresponding first and/or second identifying signal according to both the first set and the second set. For example, for cancelling the interference of the second identifying signal from the received signal, the second identifying signal indicative of the second candidate may be regenerated based on both the first set and the second set. The interference may be cancelled from the received signal by subtracting the regenerated identifying signal from the received signal. The UE may include a plurality of receive antennas. The received signal may include components from the plurality of receive antennas. The regenerating and the subtracting may be performed for each of the components of the receive antennas and/or for each in-phase (I) and quadrature (Q) component of the received signal.

One or each of the first set and the second set may be represented by a bitmask. Each bit in the bitmask may determine whether or not a corresponding sample point belongs to the set. The position of a bit in the bitmask may determine the sample point. For example, when the first bit in the bitmask representing the first set is set to 1, the first sample point out of a sequence of the first samples may belong to the first set, and when the second bit in the bitmask representing the first set is set to 1, the second sample point in the sequence of the first samples belongs to the first set, etc. The position of the bit in the bitmask may correspond to the time shift relative to the beginning of the extracted first samples and relative to the extracted second samples. The temporal resolution represented by the discrete positions of the bits may correspond to a sampling rate at which the received signal is sampled in the time domain.

The interference cancellation may be based on both the first set and the second set by combining the first set and the second set according to a bitwise conjunction of the bitmask representing the first set and the bitmask representing the second set. For example, the interference cancellation may cancel only the corresponding identifying signal indicative of the corresponding candidate to be cancelled. The interference cancellation may cancel the corresponding identifying signal only at positions in time indicated by both the first set and the second set.

A number of candidates for the first identifier (also referred to as domain of the first identifier or first hypotheses) may be greater than a number of candidates for the second identifier (also referred to as domain of the second identifier or second hypotheses). The interference may be cancelled for the first identifying signal based on the first set, optionally without taking account of the second set. The interference may be cancelled for the second identifying signal based on both the first set and the second set.

The first set and/or the second set may be selected based on a power (e.g., a squared absolute value) of channel states estimated for the first samples and the second samples, respectively. The estimated channel states may represent a transfer function of the channel used for sending the corresponding identifying signal. The channel states may be estimated in the frequency domain. The first samples and/or the second samples may be transformed from the time domain to the frequency domain, e.g., before the channel state estimation. The channel states estimated in the frequency domain for the first samples and/or the second samples may be transformed back to the time domain. The first set and/or the second set may be selected based on the power of the channel states for the first samples and the second samples, respectively, transformed to the time domain.

The channel states may be estimated for the first samples and the second samples by multiplying at least a portion of the first samples and the second samples (e.g., after transformation to the frequency domain) with a complex conjugate of the first identifying signal indicative of the first candidate and the second identifying signal indicative of the second candidate, respectively.

The extracting of the first identifying signal may be based on a timing of the first identifying signal (e.g., a beginning of a symbol including first identifying signal). The extracting of the second identifying signal may be based on a timing of the second identifying signal (e.g., a beginning of a symbol including second identifying signal). A numbering of the first set and the second set may be relative to the timing of the first identifying signal and the second identifying signal, respectively.

The different cells may be synchronized, e.g., with a predefined accuracy or precision. The timing locally applied by each of the different cells for sending the first identifying signal may be equal, e.g., within the predefined accuracy or precision. The timing locally applied by each of the different cells for sending the second identifying signal may be equal, e.g., within the predefined accuracy or precision. The predefined accuracy or precision may allow for a time shift between the different cells, e.g., of a fraction of the symbol duration.

Each of the different cells may send the first signal and the second signal using Orthogonal Frequency-Division Multiplexing (OFDM) symbols. Each cell may send the second signal and the first signal in OFDM symbols. E.g., the first samples may represent a first OFDM symbol, as received at the UE. The second samples may represent a second OFDM symbol different from the first OFDM symbol, as received at the UE. The second samples may be extracted from the first OFDM symbol. The first samples may be extracted from the second OFDM symbol. The first samples and the second samples may be separated in the received signal by at least a Cyclic Prefix (CP). For Frequency Division Duplex (FDD), e.g., in LTE, the symbols may be separated by one CP. For Time Division Duplex (TDD), e.g., in LTE, the symbols may be separated by one CP and two further complete OFDM symbols.

According to a further aspect, a computer program product is provided. The computer program product includes code portions for performing one or more of the steps of the method aspect when executed by one or more computing devices. The computer program product may be stored on a computer-readable recording medium. Alternatively or in addition, the computer program product may be provided for download to such a computer-readable recording medium in a data network. The data network may include the Internet and/or the cellular network.

According to a hardware aspect, a device for cancelling interference in a cellular network is provided. The cellular network comprises intra-frequency cells sending a first identifying signal indicative of a first identifier and a second identifying signal indicative of a second identifier. Each cell is identified by a combination of the first identifier and the second identifier. The device comprises a first extracting unit adapted to extract first samples of the first identifying signal from a signal received by a User Equipment (UE), the first samples including contributions from different cells of the cellular network; a first selecting unit adapted to select a first set of sample points based on the first samples and a first candidate for the first identifier; a second extracting unit adapted to extract second samples of the second identifying signal from the received signal, the second samples including contributions from the different cells; a second selecting unit adapted to select a second set of sample points based on the second samples and a second candidate for the second identifier; and a cancelling unit adapted to cancel the interference of at least one of the first identifying signal indicative of the first candidate and the second identifying signal indicative of the second candidate from the received signal based on both the first set and the second set.

The device may be integrated into the UE, e.g., in a baseband chip for the UE.

The device may further be adapted to, and/or may include one or more further units adapted to, perform any one of the steps disclosed in the context of the method aspect.

BRIEF DESCRIPTION OF THE DRAWINGS

In the following, the present disclosure is described in more detail with reference to exemplary embodiments illustrated in the drawings, wherein FIG. 1 schematically illustrates a cellular network comprising a plurality of intra-frequency cells.

DETAILED DESCRIPTION

In the following description, for purposes of explanation and not limitation, specific details are set forth, such as specific device and network configurations and specific methods, steps and functions, in order to provide a thorough understanding of the technique presented herein. It will be appreciated that the technique may be practiced in other embodiments that depart from these specific details. While cellular networks and cell identifiers described herein are consistent with 3GPP Long Term Evolution (LTE), the technique is also applicable in cellular networks according to the Global System for Mobile Communications (GSM) and the Universal Mobile Telecommunications System (UMTS). Furthermore, the technique is applicable in networks using access technology other than 3GPP Radio Access Technologies. For example, a Wireless Local Area Network according to the family of standards IEEE-802.11 can be structured in hotspots that correspond to the cells described herein.

Those skilled in the art will further appreciate that the methods, steps and functions described herein may be implemented using individual hardware circuitry, using software functioning in conjunction with a programmed microprocessor or a general purpose computer, using one or more Application Specific Integrated Circuits (ASICs), one or more Digital Signal Processors (DSPs) and/or one or more Field Programmable Gate Arrays (FPGAs). It will also be appreciated that the technique disclosed herein may be embodied in a processor and a memory coupled to the processor, wherein the memory stores one or more programs that perform the methods, steps and functions described herein when executed by the processor.

Figure 1:
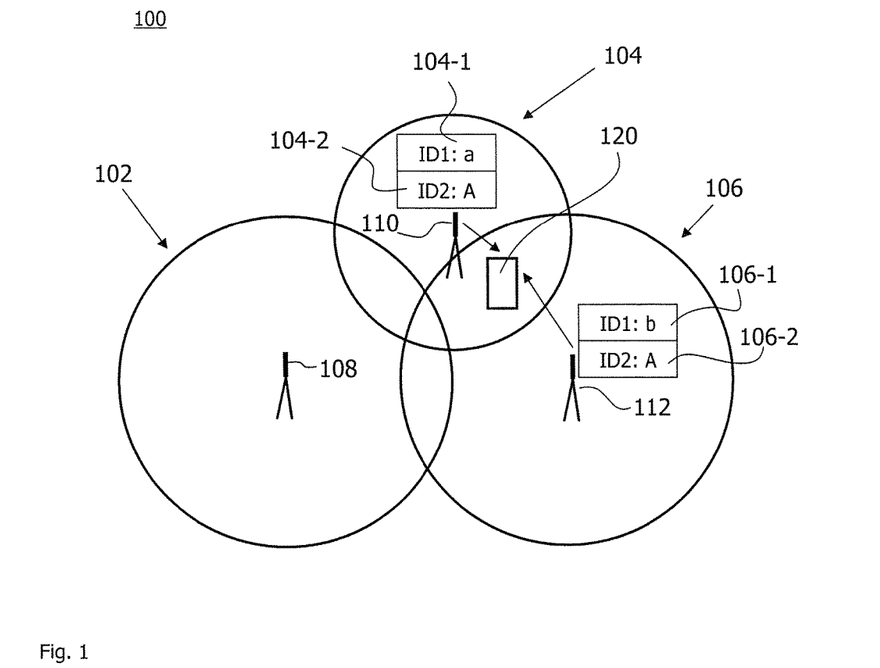

FIG. 1 schematically illustrates a cellular network 100 including a plurality of intra-frequency cells 102, 104 and 106. Each of the cells 102 to 106 includes a base station 108, 110 and 112. Herein, "intra-frequency" means that each of the base stations 108 to 112 operates on the same carrier frequency.

Each of the cells 102 to 106 periodically sends a first identifying signal indicative of a first identifier ID1 and a second identifying signal indicative of a second identifier ID2. The first identifier ID1 and the second identifier ID2 of the cell 104 are indicated at reference signs 104-1 and 104-2, respectively. Analogously, reference signs 106-1 and 106-2 indicate the first and second identifiers of the cell 106.

When a User Equipment (UE) 120 is within the range of both the cell 104 and the cell 106, it may succeed receiving the identifying signals of the cell 104 and read the first and second identifier 104-1 and 104-2 (e.g., because signal strength of the cell 104 is greater than signal strength of the cell 106). The identifying signals of the cell 104 cause intra-frequency interference, e.g., when the UE 120 searches for the further cells 102 and 106. In case of strong intra-frequency interference caused by the cell 104, it is difficult for the UE 120 to detect the identifiers 106-1 and 106-2 of the weaker cell 106. Interference cancellation for the strong interference cell 104 is necessary before searching for weaker cells 102 and 106. Conventionally, the interference cancellation is performed separately for the first identifying signal indicative of the first identifier 104-1 and for the second identifying signal indicative of the second identifier 104-2.

A radio signal received at the UE 120 includes contributions of the second identifying signal from both the interfering cell 104 and the weaker cell 106. Depending on the number of possible second identifiers ID2, the neighboring cells 104 and 106 may have identical second identifiers 104-2 and 106-2. As a consequence, the conventional interference cancellation performed for the second identifying signal based on a second candidate, ID2=A, for the second identifier 104-2 of the interfering cell 104 also cancels the second identifying signal indicative of the second identifier 106-2 of the weaker cell 106 from the received signal. Consequently, the UE 120 cannot detect additional weaker cells, such as the cell 106, having the same second identifier 106-2 as the interfering cell 104.

In the case of an LTE implementation of the cellular network 100, the first identifying signal may be the Secondary Synchronization Signal (SSS). The second identifying signal may be the Primary Synchronization Signal (PSS). The combination of the first identifier and the second identifier is also referred to as a Physical Cell Identity (PCI). There are only three different candidates (also referred to as hypotheses) for the second identifier ID2. As a consequence, the conventional interference cancellation for the PSS is likely to eliminate in the received signal contributions that represent the PSS from different cells.

Figure 2:
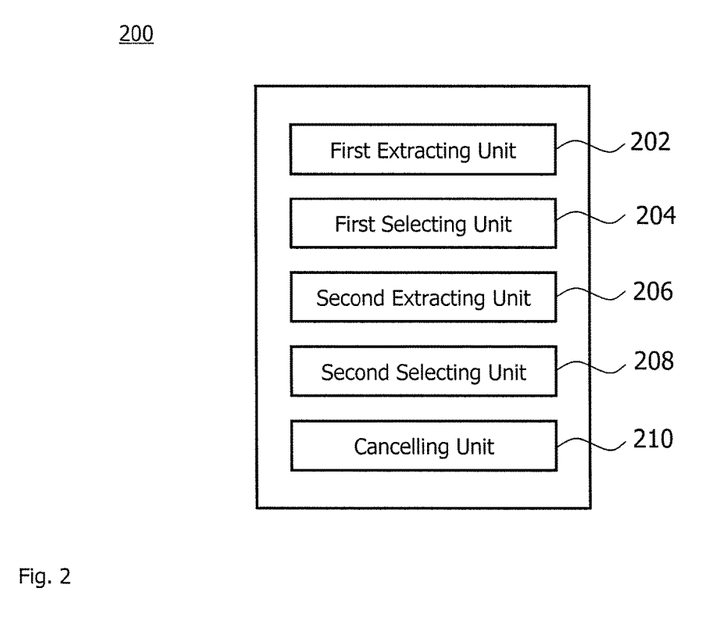
FIG. 2 schematically illustrates a first embodiment of a device for cancelling interference in the cellular network of FIG. 1.

FIG. 2 schematically illustrates a block diagram of a first embodiment of a device 200 for cancelling interference in a cellular network, such as the cellular network 100. The device 200 includes a first extracting unit 202 for extracting first samples of a first identifying signal from a signal received by a UE, such as the terminal 120 in the cellular network 100. The first samples include contributions from different cells of the cellular network, i.e., from the cell 104 and the cell 106 of FIG. 1.

The device 200 further includes a first selecting unit 204 for selecting a first set of sample points out of the first samples based on the first samples and a first candidate, e.g., ID1=a, for the first identifier ID1.

The device 200 further includes a second extracting unit 206 and a second selecting unit 208. The first and second extracting units 202 and 206 can be implemented as first and second instances of an extracting object. The first and second selecting units 204 and 208 can be implemented as first and second instances of a selecting object.

The second extracting unit 206 is applied to the received signal and extracts second samples different from the first samples. The second samples represent the second identifying signal and include contributions from different cells, i.e., the cells 104 and 106. The second selecting unit 208 selects a second set of sample points out of the second samples based on the second samples and a second candidate, e.g., ID2=A, for the second identifier ID2.

The device 200 further includes a cancelling unit 210 for cancelling the interference due to the first identifying signal indicative of the first candidate and/or the second identifying signal indicative of the second candidate. The interference is cancelled from the received signal based on both the first set and the second set.

Figure 3:
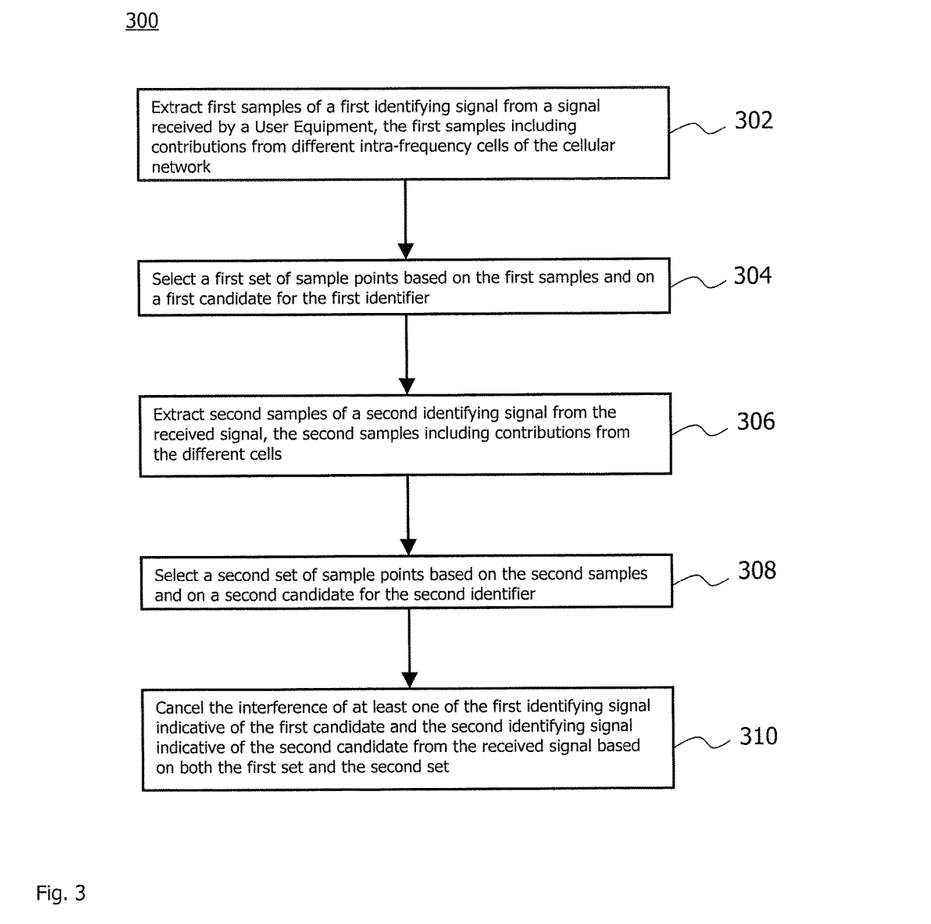
FIG. 3 shows a flowchart of a method of cancelling interference in the cellular network of FIG. 1.

FIG. 3 shows a flowchart of a method 300 of cancelling interference in a cellular network comprising intra-frequency cells sending a first identifying signal indicative of a first identifier and a second identifying signal indicative of a second identifier. The first identifying signal and the second identifying signal are included in a signal received by a UE performing the method 300. Each of the cells within the range of the UE is identifiable based on a combination of the first identifier and the second identifier.

First samples of the first identifying signal are extracted from the signal received by the UE in a step 302. The first samples include contributions as to the first identifying signal from different intra-frequency cells of the cellular network. A first set of sample points is selected based on the first samples and on a given first candidate of the first identifier in a step 304.

Second samples of the second identifying signal are extracted from the received signal in a step 306. The second samples include contributions as to the second identifying signal from those cells that contributed to the first samples. In a step 308 of the method 300, a second set of sample points is selected based on the second samples and on a given second candidate for the second identifier.

The interference of at least one of the first identifying signal indicative of the first candidate and the second identifying signal indicative of the second candidate is cancelled from the received signal using both the first set and the second set in a step 310 of the method 300.

The units 202 to 210 of the device 200 may perform the steps 302 to 310, respectively. The device 200 and the method 300 are implemented in the UE 120. The cellular network may include the intra-frequency cell 102, 104 and 106, e.g., in addition to further inter-frequency and intra-frequency cells.

Figure 4:
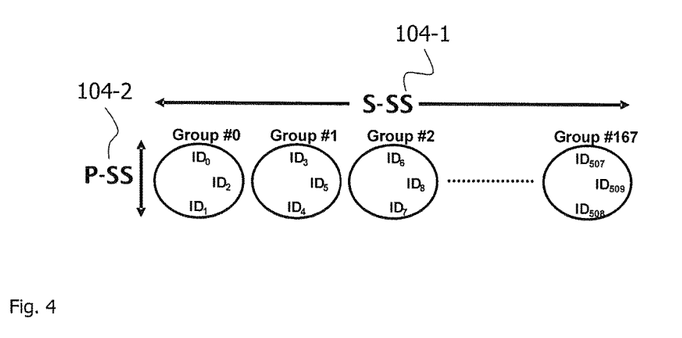
FIG. 4 schematically illustrates a combination of a first identifier and a second identifier for identifying the intra-frequency cells of FIG. 1.

FIG. 4 illustrates the structure of a cell identifier $N_{ID}^{(cell)}$, which is also referred to as the Physical Cell Identity (PCI) in LTE networks 100. The $N_{ID}^{(cell)}$ results from a combination of the first identifier $N_{ID}^{(1)}$ included in the first identifying signal SSS and the second identifier $N_{ID}^{(2)}$ included in the second identifying signal PSS. The combination of PSS and SSS identifies one out of 502 different PCIs. The SSS indicates one out of 168 cell-identity groups, $N_{ID}^{(1)} \in [0, 167]$. The PSS indicates one out of 3 different cell identities, $N_{ID}^{(2)} \in [0,2]$, within each of the cell-identity groups according to:

$$N_{ID}^{(cell)} = 3 N_{ID}^{(1)} + N_{ID}^{(2)}.$$

The mobile device 120 uses PSS and SSS jointly for searching available cells and reading cell parameters corresponding to the cell identified by the PCI.

In a typical cell search procedure, the PSS is detected. The PSS is included in the last symbol 504 of the first slot in each radio frame sent by the cell 104, as is schematically illustrated in the frequency-time grid 500 in FIG. 5 for an Frequency Division Duplex (FDD) implementation in LTE. Frequency is shown along the vertical direction and time along the horizontal direction of the grid 500. Frequency is structured in Resource Blocks (RB), each of which includes 12 subcarriers. Time is structured in subframes, each of which encompasses 1 millisecond subdivided into 2 slots. Each slot includes (in the case of normal cyclic prefix) 7 Orthogonal Frequency-Division Multiplexing (OFDM) symbols.

Figure 5:
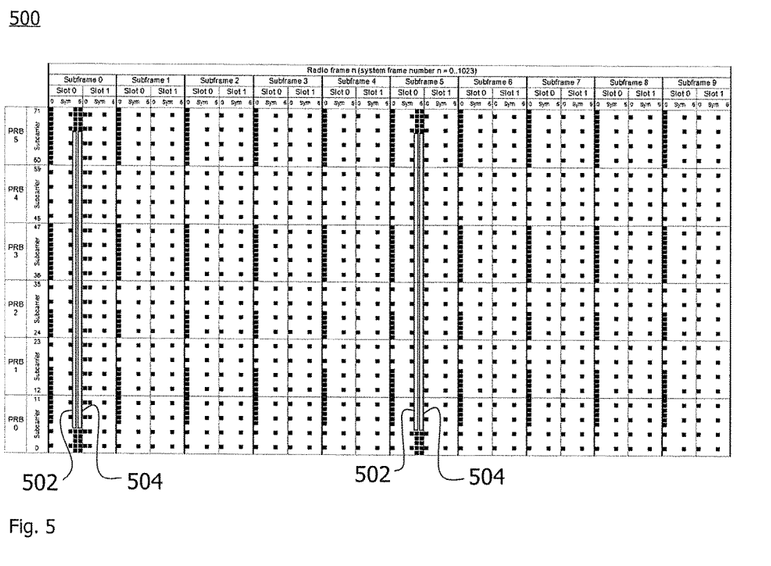
FIG. 5 schematically illustrates resource elements sent by cells of the cellular network of FIG. 1 in the range of reception of a User Equipment.

The signal received at each of the one or more receive antennas of the UE 120 is sampled (after down-conversion) at a sampling rate of, e.g., 1.92 MHz. For a useful OFDM symbol duration of 66.7 microseconds, each of the first samples and the second samples include 128 samples. The total duration of one OFDM symbol further includes a normal cyclic prefix (CP) length of 4.7 microseconds corresponding to 9 further samples. In a variant operating at a sampling rate equal to 30.72 MHz, the first samples include 66.7 microseconds×30.72 MHz=2048 samples. In further variants, the number of the first samples and the number of the second samples is in the range between 128 and 2048, e.g., 256, 512 or 1024.

Since the PSS is repeated in the last symbol of the first slot in the sixth subframe, the UE 120 is synchronized with the cell 104 on a 5-millisecond basis. Furthermore, the UE 120 reads the second identifier $N_{ID}^{(2)}$.

The UE 120 then detects the first identifying signal SSS indicated at reference sign 502 in the frequency-time grid 500. The PSS 504 and the SSS 502 are sent by the cell 104 in subsequent OFDM symbols in the case of an FDD implementation. Based on the SSS 502, the UE 120 receives the frame timing, the Cyclic Prefix (CP) length and the first identifier $N_{ID}^{(1)}$ specifying the cell-identity group. The technique also applies to TDD implementations.

Figure 6:
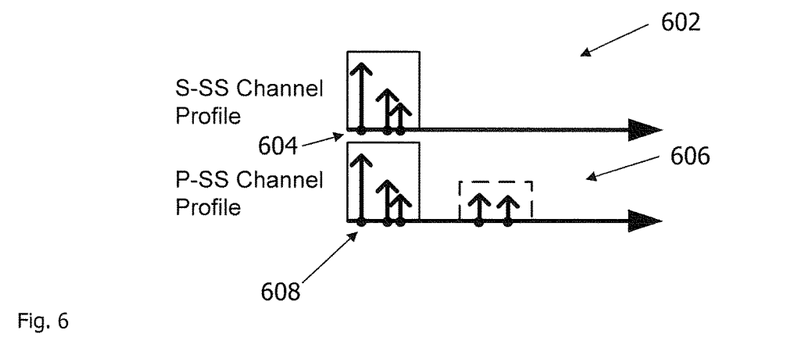
FIG. 6 schematically illustrates exemplary power profiles of channel states measured by the User Equipment.

FIG. 6 schematically illustrates power 602 of channel states as a function of time (which is also referred to as a channel profile) for the first identifying signal 502. The origin of the time axis is aligned with the beginning of the OFDM symbol allocated to the first identifying signal 502. The position of the first arrow (on the left-hand side) of the first channel profile 602 corresponds to the first of the first samples. The channel states represent a response function of the channel. The length of the first arrow schematically represents the power 602 of the channel state, e.g., the square of the absolute value of the channel response function, at the first sample of the first identifying signal 502, and accordingly for the further first samples.

The time axis of the first channel state power 602 shown in FIG. 6 approximately encompasses the first 10 samples of the first samples. Black circles 604 on the time axis in FIG. 6 indicate the first set of sample points. The first set of sample points 604 is selected in the step 304 by selecting those first samples, the channel state power 602 of which exceeds a pre-defined selection threshold.

Similarly, a profile of power 606 of the channel states for the second identifying signal 504 is indicated by vertical arrows. The length of each of the arrows indicates the square of the amplitude of the channel response function at the corresponding points 608 on the time access representing the second set. The origin of the time axis for the profile of channel state power 606 for the second identifying signal 504 is aligned with the beginning scheduled for the OFDM symbol 504 allocated to the second identifying signal.

Since the first identifiers 104-1 and 106-1 differ for the cells 104 and 106, the first set 604 of sample points selected based on the first candidate 104-1 indicates contributions (also referred to as paths) of the cell 104 exclusively. The second identifier is less specific than the first identifier. Since the second set 608 is selected based on the second candidate 104-2, which coincides with the second identifier 106-2 of the cell 106, the second set 608 includes contributions from both the cell 104 (indicated by the solid-line envelope) and the cell 106 (indicated by the dashed-line envelope).

Since the time axis for the first set 604 selected out of the first samples and the time axis for the second set 608 selected out of the second samples is aligned with the OFDM symbols 502 and 504 including the first and second identifying signals, respectively, the first set 604 and the second set 608 indicate a time shift or a delay due to signal propagation. Therefore, the first set 604 and the second set 608 are also referred to as paths. The time shifts or paths represented by the first set 604 relate to the first identifying signal filtered according to the first candidate for the first identifier. The second set 608 represents time shifts or paths of the second identifying signal filtered according to the second candidate for the second identifier.

Figure 7:
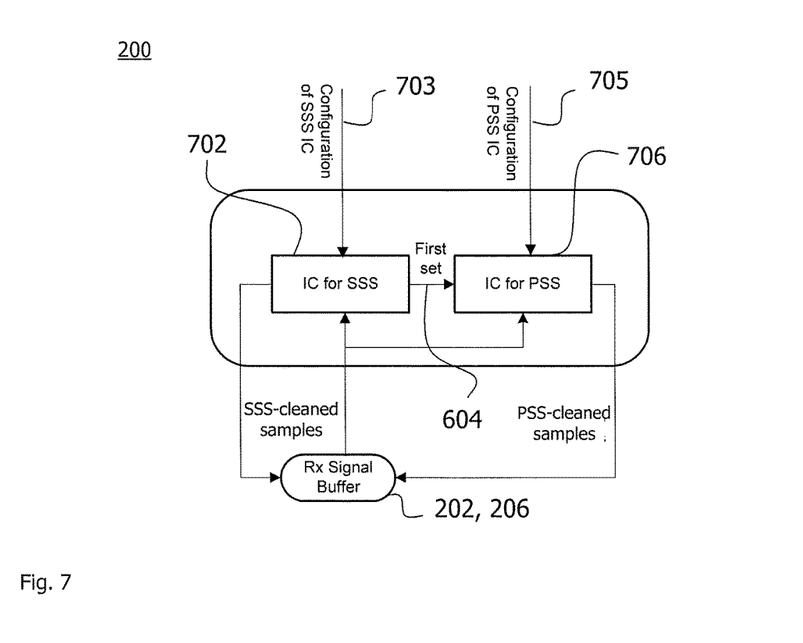
FIG. 7 schematically illustrates a block diagram for a second embodiment of a device for cancelling interference in the cellular network of FIG. 1.

FIG. 7 schematically illustrates a block diagram of a second embodiment of the device 300 for cancelling interference in a cellular network. The second embodiment shown in FIG. 7 differs from the first embodiment shown in FIG. 3 in that the interference cancellation is performed for both the first identifying signal SSS and the second identifying signal PSS by a first interference cancellation entity 702 and a second interference cancellation entity 706, respectively.

A receive signal buffer realizes the unit 202 by extracting the first samples that are provided to the first interference cancellation entity 702. The receive signal buffer also realizes the unit 06 by extracting the second samples that are provided to the second interference cancellation entity 706.

The first interference cancellation entity 702 includes the selecting unit 204 for selecting the first set 604 based on the extracted first samples and the first candidate included in configuration information 703. The first set 604 is represented by channel information that is provided to the second interference cancellation entity 706. The second interference cancellation entity 706 includes the selecting unit 208 for selecting the second set 608 based on the extracted second samples and the second candidate included in configuration information 705.

The functionality of the cancelling unit 210 is implemented in the first interference cancellation entity 702 for cancelling the interference of the first identifying signal SSS indicative of the first candidate, e.g., the first candidate 104-1. The functionality of the cancelling unit 210 for cancelling the interference of the second identifying signal PSS indicative of the second candidate is implemented in the second interference cancellation entity 706.

The symmetric functional arrangement of the first interference cancellation entity 702 and the second interference cancellation entity 706 enables implementing the entities 702 and 706 as instances of the same object. The interference cancellation entities 706 (for the PSS) and 702 (for the SSS) share the same functional structure shown in FIG. 8 with different configurations (i.e., different input values and parameters).

Figure 8:
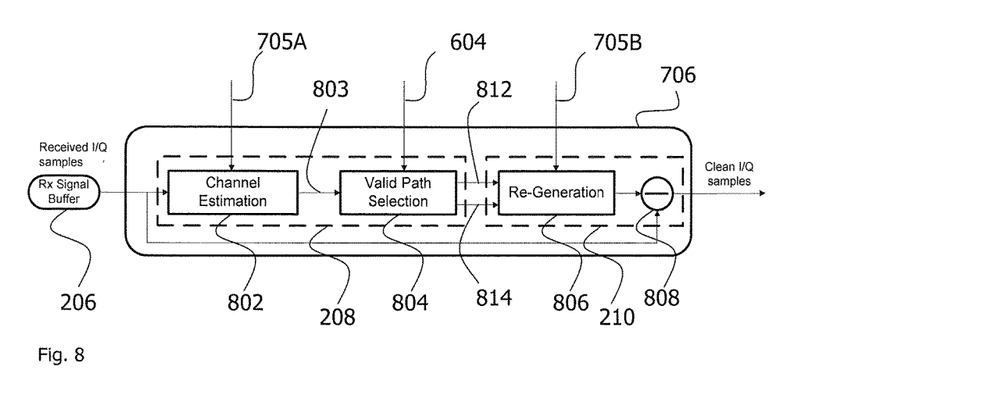
FIG. 8 schematically illustrates a block diagram of an interference cancellation entity instantiated twice in the device of FIG. 7.

FIG. 8 schematically illustrates a block diagram including the receive signal buffer realizing the functionality of the second extracting unit 206 and the instance for the second interference cancellation entity 706. The receive signal buffer 206 extracts the second samples representing the OFDM symbol 502. The second samples are provided to the second selecting unit 208.

The second selecting unit 208 includes a channel estimation sub-unit 802 and a valid path selection sub-unit 804. The configuration information 705 includes a frequency domain representation 705A of an ideal second identifying signal indicative of the second candidate. Using the frequency domain representation 705A, the channel states $h_0$, $h_1$, $h_2$, ... (collectively referred to by reference sign 803) are estimated based on the extracted second samples. In the time domain, the channel state $h_0$ represents the estimate for the first sample of the second samples, the channel state $h_1$ represents the estimate for the second sample of the second samples, etc. The channel states 803 are provided in the time domain to the valid path selection sub-unit 804.

Figure 9:
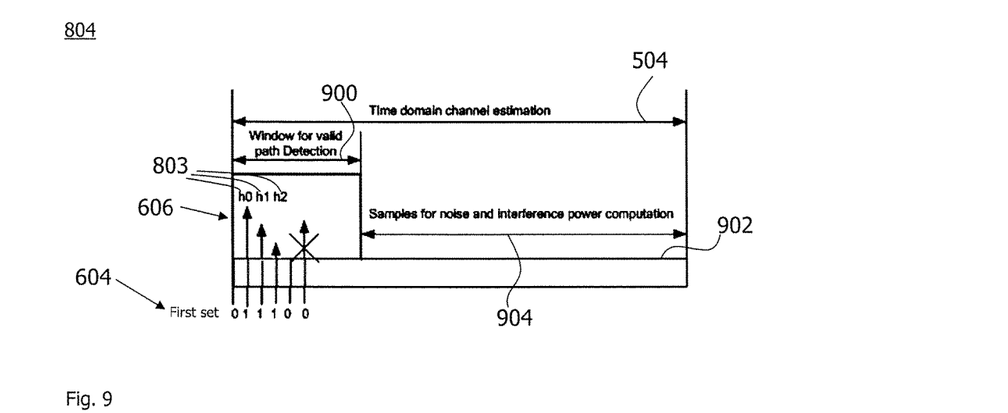
FIG. 9 schematically illustrates a valid path selection performed by the entity of FIG. 8 based on both a first set and a second set of sample points.

The squares 606 of the absolute values of the individual channel states 803 are computed for those points in time falling within a predefined selection window 900, if the corresponding sample is included in the first set 604. In other words, only those samples that belong to the first set 604 are considered for the cancellation of the second identifying signal. FIG. 9 schematically illustrates the time domain of the second identifying signal 504 and the selection window 900 at the beginning of the symbol duration. The power 606 of the channel states 803 is schematically illustrated by vertical arrows.

The first set 604 is included in the channel information provided to the second interference cancellation entity 706. The first set 604 indicates samples by listing the corresponding points in time, by listing the corresponding sample numbers or by means of a bitmap (as indicated in FIG. 9). The first set 604 is extrinsic information from the perspective of the second interference cancellation entity 706. The first set 604 indicates valid paths selected based on the first identifying signal 502.

Furthermore, it is required that the square 606 of the absolute value of each of the channel states 803 exceeds the selection threshold 902. Determining whether or not the value of the individual channel states 803 exceeds the selection threshold 902 is an implementation of the second selecting step 308. Otherwise, the corresponding point in time is not considered for the second interference cancellation (i.e., the corresponding samples is not included in the second set 608). The sample-wise conjunction 812 of the first set and the second set are provided to the cancelling unit 210. The second set 608 does not have to be computed explicitly and/or does not have to be stored in memory. For example, determining the conjunction 812 may be part of the second selecting step 308. For instance, only the samples indicated by the first set 604 are checked for the selection threshold 902.

In the second embodiment of the device 200 shown in FIG. 7, the first instance for the first interference cancellation entity 702 ignores extrinsic information or sets all bits of the bitmap representing the extrinsic information to one.

A first variant of the second embodiment for the device 200 uses mutual extrinsic information. The extrinsic information that is input to the first interference cancellation entity 702 includes the second set 608 provided by the second interference cancellation entity 706. The first set 604 provided by the first interference cancellation entity 702 is input to the second interference cancellation entity 706 (as shown in FIG. 7).

Optionally, the selection threshold 902 depends on a noise level. For example, the selection threshold 902 depends linearly on the noise level. The time domain of the OFDM symbol 504 including the second samples is sub-divided into the selection time window 900 for computing the power 606 of the channel states 803 and a window 904 for computing the noise level, e.g., power of noise and interference.

The second interference cancellation entity 706 comprises the cancelling unit 210. The cancelling unit 210 includes a regeneration sub-unit 806 and a subtraction sub-unit 808. The combination 812 of the first set and the second set are output as combined channel information to the regeneration sub-unit 806.

Optionally, the valid path selection sub-unit 804 provides a clean channel profile 814 to the regeneration sub-unit 806. The clean channel profile 814 includes coefficients ($h_0$, $h_1$, $h_2$, ... ) of the channel states 803 only for those sample points, i.e., points in time, for which the valid path selection sub-unit 804 determined a point in time (i.e., if the point in time is indicated by the combination 812 of the first set 604 and the second set 608).

Figure 10:
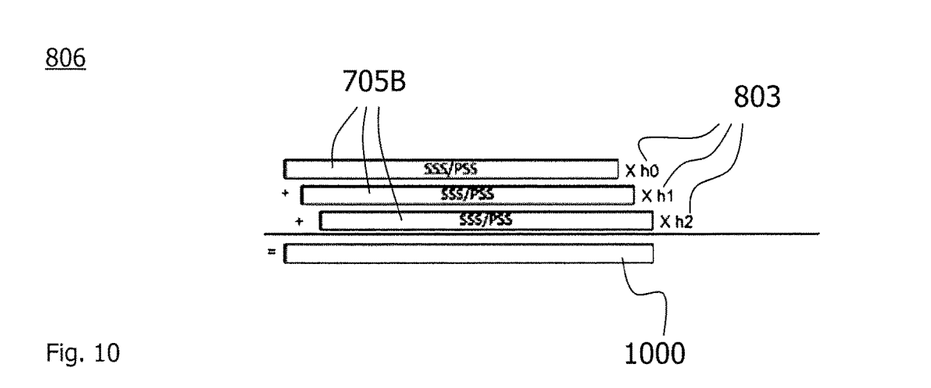
FIG. 10 schematically illustrates a signal regeneration performed by the entity of FIG. 8 based on the valid path selection of FIG. 9.

The operation of the regeneration sub-unit 806 is schematically illustrated in FIG. 10. Time domain representations 705B of the ideal second identifying signals indicative of the second candidate are combined in the time domain. There is one copy of the time domain representation 705B of the ideal second identifying signal for each point in time (i.e., for each valid path) indicated in the combination 812. Each copy of the time domain representation 705B is weighted according to the coefficient (e.g., included in the clean channel profile 814) representing the channel state 803 at the corresponding point in time (e.g., the sample number indicated by the combination 812). The weighted ideal second identifying signals 705B are time-shifted to the corresponding point in time and added up. The addends are time-shifted according to the temporal position indicated by the combination 812 relative to the beginning of the OFDM symbol 504.

In the subtraction sub-unit 808, the regenerated second identifying signal 1000 is subtracted from the second samples representing the received OFDM symbol 504. The interference caused by the cell 104 is thus removed in the resulting second samples without removing the PSS signal contributions from cell 106. The interference-free second samples are written back to the receive signal buffer for further analysis of the received signal as to the cell 106. During the interference regeneration 806 and the subtraction 808, a signal included in the CP is also considered.

An exemplary implementation of the computation performed by the interference cancellation entities 702 and 706 is described. Firstly, the first interference cancellation entity 702 executes interference cancellation for the SSS and outputs the first set 604 to indicate which of the sample points correspond to a valid path. Secondly, the second interference cancellation entity 706 executes interference cancellation for the PSS. The channel estimation 802 based on the PSS is restricted to those sample points indicated by the first set 604 derived from the SSS. In other words, a sample point (i.e., a path) is kept in the channel estimation 802 for the PSS, only if the first set 604 derived from the SSS also indicates this sample point. The channel estimation sub-unit 802 computes the channel estimation 803 in the time domain. The channel estimation 802 for the PSS is used for the PSS regeneration 806.

For conciseness, the common structure underlying the first and second interference cancellation entities 702 and 706 is described, wherein XSS denotes the SSS for the first interference cancellation entity 702 and the PSS for the second interference cancellation entity 706. Similarly, the word "samples" refers to the first samples in the instance for the entity 702 and to the second samples in the instance for the entity 706.

Firstly, the target XSS signal is extracted from the received signal for each antenna according to the steps 302 and 306:

$$\hat{S}_T^{(q)} = \hat{r}^{(q)}(t-\Delta : t-\Delta+L_{FFT}), q=0 \sim N_{RX}-1.$$

Herein, $\hat{r}^{(q)}$ is the received signal on the $q^{th}$ receive antenna. The received signal is mixed including signal contributions from different cells. The length of the received signal is $L_{sig}$. $N_{RX}$ is the number of receive antennas. The parameter $t$ is the timing of the XSS. $\hat{S}_T^{(q)}$ denotes the extracted samples of the XSS in the time domain of length $L_{FFT}$, e.g., 128 samples. An offset $\Delta$ is the sample number to be in advance for data extraction.

Secondly, the channel estimation sub-unit 802 transforms the samples $\hat{S}_T^{(q)}$ to the frequency domain by Fast Fourier Transformation (FFT), $$\hat{S}_F^{(q)} = FFT(\hat{S}_T^{(q)}),$$

wherein $\hat{S}_F^{(q)}$ represents the XSS in the frequency domain.

Thirdly, a complex conjugate of the frequency domain representation 705A of the ideal identifying signal $S_F^{(XSS)}(m)$ is multiplied with the received and extracted XSS samples, resulting in a channel estimation in the frequency domain:

$$\hat{h}_F^{(q)}(m') = \hat{S}_F^{(q)}(m')(S_F^{(XSS)}(m))^*,$$

wherein $$m' = \begin{cases} m + L_{FFT} - 31, & 0 \le m \le 30 \\ m - 30, & 31 \le m \le 61 \end{cases}, m = 0, 1, \ldots 61.$$

Herein, $S_F^{(XSS)}(m)$, $m=0, 1, \ldots 61$ is the ideal (i.e. originally transmitted) XSS sequence in the frequency domain and $\hat{h}_F^{(q)}(m')$ is the channel estimation for the XSS in the frequency domain.

Fourthly, the sequence $\hat{h}_F^{(q)}(m')$ is partly set to zero:

$$\hat{h}_F^{(q)}(m')=0, m'=0,32,33,\ldots L_{FFT}-32.$$

Fifthly, an Inverse FFT (IFFT) transforms the channel estimation from the frequency domain to the time domain:

$$\hat{h}_T^{(q)}(m') = IFFT(\hat{h}_F^{(q)})/\sqrt{L_{FFT}},$$

wherein $\hat{h}_T^{(q)}$ is the channel estimation 803 for the XSS in the time domain with length $L_{FFT}$.

The valid path selection sub-unit 804 picks up the first set 604 indicative of the valid paths and calculates channel information 812 to indicate which path is valid.

Firstly, the channel profile of the one or more receive antennas is combined:

$$\hat{P}(n) = \sum_{q=0}^{N_{RX}-1} g_q \left| \hat{h}_T^{(q)}(n) \right|^2.$$

Herein, $g_q$ is the weight of the different antennas and $\hat{P}(n)$ is the combined channel profile 602/606 in terms of power.

Secondly, $N_{max}$ paths that are greatest in power are selected in the selection window 900 for the first/second set. The selection window 900 encompasses a range $[0, 1, \ldots L_{win}-1]$ in terms of first/second samples, i.e., the first $L_{win}$ samples of the sequence of the first/second samples fall within the selection window 900 for searching valid paths. The first/second set is represented by $N_{max}$ indices, $[i_0, i_1, \ldots i_{N_{max}-1}]$, each of which identifies one sample in the set.

Thirdly, the noise power is computed based on the channel state power $\hat{P}$ of those samples that are out of the selection window 900:

$$\sigma^2 = \frac{\sum_{n=L_{win}}^{L_{FFT}-1} \hat{P}(n)}{L_{FFT} - L_{win}}.$$

Fourthly, the sub-unit 804 verifies that each of the $N_{max}$ paths exceeds the selection threshold, $\rho\sigma^2$, (which corresponds to the first/second set), and that the $N_{max}$ paths are indicated by the first set 604, e.g., represented by the bitmask $f_{in}$, from outside:

$$\hat{P}(i_k) = \begin{cases} 0, & \text{if } \hat{P}(i_k) < \rho\sigma^2 \\ \hat{P}(i_k) f_{in}(i_k), & \text{otherwise} \end{cases}, k = 0, 1, \ldots N_{max}-1.$$

For the interference cancellation of the SSS, the first interference cancellation entity 702 initializes the bitmask $f_{in}$ by an all-ones-sequence with length $L_{win}$. For the interference cancellation of the PSS, the second interference cancellation entity 706 is provided with the first set 604 by means of the bitmap $f_{in}$ from the first interference cancellation entity 702.

Fifthly, a clean channel profile 814 is determined for output to the regeneration sub-unit 806:

$$h_T^{(q)}(i_k) = \begin{cases} 0, & \text{if } \hat{P}(i_k) = 0 \\ \hat{h}_T^{(q)}(i_k), & \text{otherwise} \end{cases}, k = 0, 1, \ldots N_{max}-1$$

Herein, $h_T^{(q)}$ is the clean channel profile 814, which is initialized by an all-zeros-sequence with length $L_{win}$.

Sixthly, channel information $f_{out}$ is determined for output 812 to the regeneration sub-unit 806:

$$f_{out}(i_k) = \begin{cases} 0, & \text{if } \hat{P}(i_k) = 0 \\ 1, & \text{otherwise} \end{cases}, k = 0, 1, \ldots N_{max}-1$$

In the case of the first interference cancellation entity 702, the channel information $f_{out}$ is output to the second interference cancellation entity 706.

The interference of the XSS is regenerated by the sub-unit 806. To remove the interference as much as possible, the minimum CP length $\Delta_{cp\_min}$ is taken into account. E.g., $\Delta_{cp\_min}=9$ in case of $L_{FFT}=128$. So the length of the ideal XSS (i.e., the originally sent XSS) sequence in the time domain has a length $L_{XSS}=L_{FFT}+\Delta_{cp\_min}$.

Firstly, a regenerated interference, $\hat{I}^{(q)}$, is initialized as an all-zeros-sequence with length $L_{XSS}+L_{win}-1$.

Secondly, interference regeneration is performed path by path. An exemplary implementation of the regeneration sub-unit 806 is outlined by below pseudo-code:

```
for k = 0: N_max - 1
    if f_out(i_k) == 0
        I^(q)(i_k: i_k + L_XSS) = I^(q)(i_k: i_k + L_XSS - 1) + h_T^(q)(i_k)S_T^(XSS),
        q = 0~N_RX - 1
    end
end
```

Above implementation of the regeneration sub-unit 806 is an approximation that avoids a convolution (in the time domain). Advantageously, the complexity of the implementation only depends on the number of valid paths.

The interference is removed from the received signal by the subtraction sub-unit 808 to get clean first/second samples.

Firstly, the subtraction sub-unit 808 checks if the signal to be cancelled is out of the signal range before cancellation. A typical start point is $$t_{start} = t^{(XSS)} - \Delta - \Delta_{cp\_min}.$$

The start point is changed, if above value is smaller than 0:

$$t_{start} = \max(t^{(XSS)} - \Delta - \Delta_{cp\_min}, 0).$$

The offset caused by the change relative to the typical start point is $\Delta_{start}$:

$$\Delta_{start} = t_{start} - (t^{(XSS)} - \Delta - \Delta_{cp\_min})$$

A typical end point is $$t_{end} = t^{(XSS)} - \Delta + L_{FFT} + L_{win} - 1.$$

The end point is changed, if above value is greater than $L_{sig} - 1$:

$$t_{end} = \min(t^{(XSS)} - \Delta + L_{FFT} + L_{win} - 1, L_{sig} - 1)$$

The offset caused by the change relative to the typical end point is $\Delta_{end}$:

$$\Delta_{end} = t^{(XSS)} - \Delta + L_{FFT} + L_{win} - 1 - t_{end}.$$

Secondly, the interference is subtracted from the received signal within the range $[t_{start}, t_{end}]$:

$$\hat{r}^{(q)}(t_{start}:t_{end}) = r^{(q)}(t_{start}:t_{end}) - I^{(q)}(\Delta_{start}:L_{XSS} + L_{win} - 1 - \Delta_{end}),$$

$$q = 0 \sim N_{RX} - 1.$$

As has become apparent based on above exemplary embodiments, at least some embodiments of the technique allow cancelling signals of an interfering cell, even if the signal to be cancelled does not uniquely identify the interfering cell. Cells in a cellular network uniquely identified by two or more identifiers can be efficiently cancelled based on the combination of the identifiers for each interfering cell. The interference cancellation can be performed for one or all of the signals indicative of the corresponding identifier.

In the foregoing, particular principles, preferred embodiments and various modes of implementing the techniques disclosed herein have exemplarily been described. However, the present invention should not be construed as being limited to the particular principles, embodiments and modes discussed above. Rather, it will be appreciated that variations and modifications may be made by a person skilled in the art without departing from the scope of the present invention as defined in the following claims.

The invention claimed is:

1. A method of cancelling interference in a cellular network, the cellular network comprising intra-frequency cells sending a first identifying signal indicative of a first identifier and a second identifying signal indicative of a second identifier, wherein each intra-frequency cell is identified by a combination of the first identifier and the second identifier, the method comprising:
    extracting first samples of the first identifying signal from a signal received by a User Equipment, the first samples including contributions from different intra-frequency cells of the cellular network;
    selecting a first set of sample points based on the first samples and a first candidate for the first identifier;
    extracting second samples of the second identifying signal from the received signal, the second samples including contributions from the different intra-frequency cells;
    selecting a second set of sample points based on the second samples and a second candidate for the second identifier; and
    cancelling the interference of at least one of the first identifying signal indicative of the first candidate and the second identifying signal indicative of the second candidate from the received signal based on both the first set of sample points and the second set of sample points,
    wherein the first samples and the second samples are extracted in the time domain,
    wherein the first set of sample points and the second set of sample points are selected in the time domain, and wherein:
        the first set of sample points is selected out of a predefined selection time window on a time axis of the first samples; and/or
        the second set of sample points is selected out of a predefined selection time window on a time axis of the second samples.

2. The method of claim 1, wherein at least one of:
    the first set of sample points is selected out of the first 10% of sample points on a time axis of the first samples; and
    the second set of sample points is selected out of the first 10% of sample points on a time axis of the second samples.

3. The method of claim 1, wherein the interference cancellation includes regenerating the corresponding identifying signal according to the first set of sample points and the second set of sample points.

4. The method of claim 3, wherein the interference is cancelled from the received signal by subtracting the regenerated identifying signal.

5. The method of claim 1, wherein at least one of the first set of sample points and the second set of sample points is represented by a bitmask, and wherein each bit in the bitmask determines whether or not a corresponding sample point belongs to the set.

6. The method of claim 5, wherein the interference cancellation is based on both the first set of sample points and the second set of sample points according to a bitwise conjunction of a bitmask representing the first set of sample points and a bitmask representing the second set of sample points.

7. The method of claim 1, wherein a number of candidates for the first identifier is greater than a number of candidates for the second identifier.

8. The method of claim 7, wherein:
    the interference is cancelled for the first identifying signal based on the first set of sample points and independently of the second set of sample points; and
    the interference is cancelled for the second identifying signal based on both the first set of sample points and the second set of sample points.

9. The method of claim 1, wherein the first set of sample points and the second set of sample points are selected based on a power of channel states in the time domain estimated for the first samples and the second samples, respectively.

10. The method of claim 9, further comprising estimating the channel states in the frequency domain and transforming the estimated channel states to the time domain.

11. The method of claim 10, wherein the channel states are estimated for the first samples and the second samples by:
   transforming the first samples and the second samples to the frequency domain; and
   multiplying at least a portion of the first samples and the second samples with a complex conjugate of the first identifying signal and the second identifying signal reproduced according to the first candidate and the second candidate for the first identifier and the second identifier, respectively.

12. The method of claim 1, wherein:
   the extraction of the first identifying signal is based on a timing of the first identifying signal; and
   the extraction of the second identifying signal is based on a timing of the second identifying signal.

13. The method of claim 1, wherein the different intra-frequency cells are synchronized.

14. The method of claim 1, wherein each intra-frequency cell sends the first identifying signal and the second identifying signal in Orthogonal Frequency-Division Multiplexing (OFDM) symbols.

15. The method of claim 1, wherein the first samples and the second samples are separated by at least a cyclic prefix.

16. A computer program product stored in a non-transitory computer readable medium for cancelling interference in a cellular network, the cellular network comprising intra-frequency cells sending a first identifying signal indicative of a first identifier and a second identifying signal indicative of a second identifier, wherein each intra-frequency cell is identified by a combination of the first identifier and the second identifier, the computer program product comprising software instructions which, when run on one or more processing circuits of a computing device, cause the computing device to:
   extract first samples of the first identifying signal from a signal received by a User Equipment, the first samples including contributions from different intra-frequency cells of the cellular network;
   select a first set of sample points based on the first samples and a first candidate for the first identifier;
   extract second samples of the second identifying signal from the received signal, the second samples including contributions from the different intra-frequency cells;
   select a second set of sample points based on the second samples and a second candidate for the second identifier; and
   cancel the interference of at least one of the first identifying signal indicative of the first candidate and the second identifying signal indicative of the second candidate from the received signal based on both the first set of sample points and the second set of sample points,
   wherein the first samples and the second samples are extracted in the time domain,
   wherein the first set of sample points and the second set of sample points are selected in the time domain, and
   wherein:
      the first set of sample points is selected out of a predefined selection time window on a time axis of the first samples; and/or
      the second set of sample points is selected out of a predefined selection time window on a time axis of the second samples.

17. A device for cancelling interference in a cellular network, the cellular network comprising intra-frequency cells sending a first identifying signal indicative of a first identifier and a second identifying signal indicative of a second identifier, wherein each intra-frequency cell is identified by a combination of the first identifier and the second identifier, the device comprising:
   processing circuitry; and
   a memory containing instructions executable by the processing circuitry, whereby the processing circuitry is operative to:
      extract first samples of the first identifying signal from a signal received by a User Equipment, the first samples including contributions from different intra-frequency cells of the cellular network;
      select a first set of sample points based on the first samples and a first candidate for the first identifier;
      extract second samples of the second identifying signal from the received signal, the second samples including contributions from the different intra-frequency cells;
      select a second set of sample points based on the second samples and a second candidate for the second identifier; and
      cancel the interference of at least one of the first identifying signal indicative of the first candidate and the second identifying signal indicative of the second candidate from the received signal based on both the first set of sample points and the second set of sample points,
   wherein the first samples and the second samples are extracted in the time domain,
   wherein the first set of sample points and the second set of sample points are selected in the time domain, and
   wherein:
      the first set of sample points is selected out of a predefined selection time window on a time axis of the first samples; and/or
      the second set of sample points is selected out of a predefined selection time window on a time axis of the second samples.

* * * * *